Patented June 21, 1932

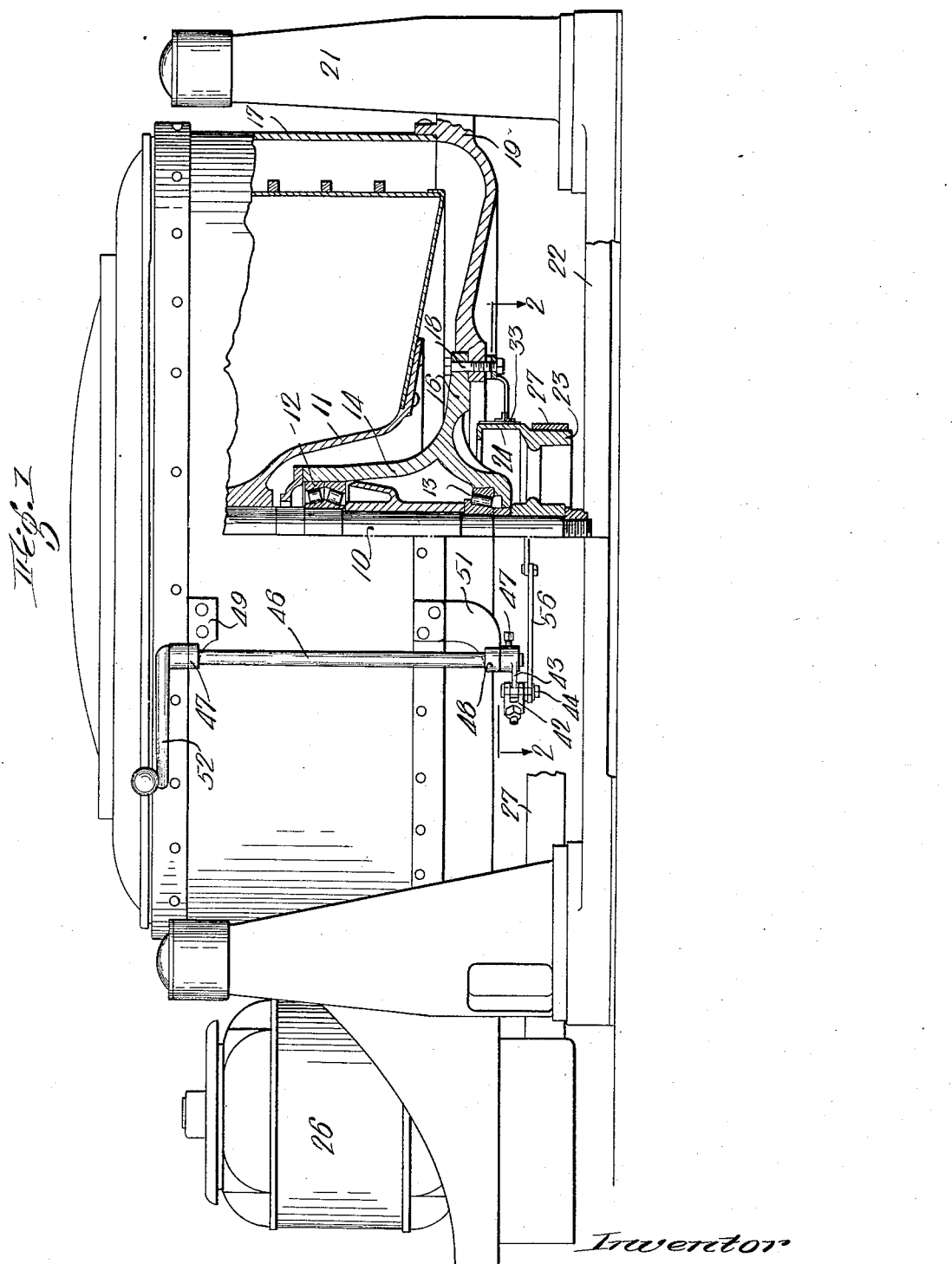

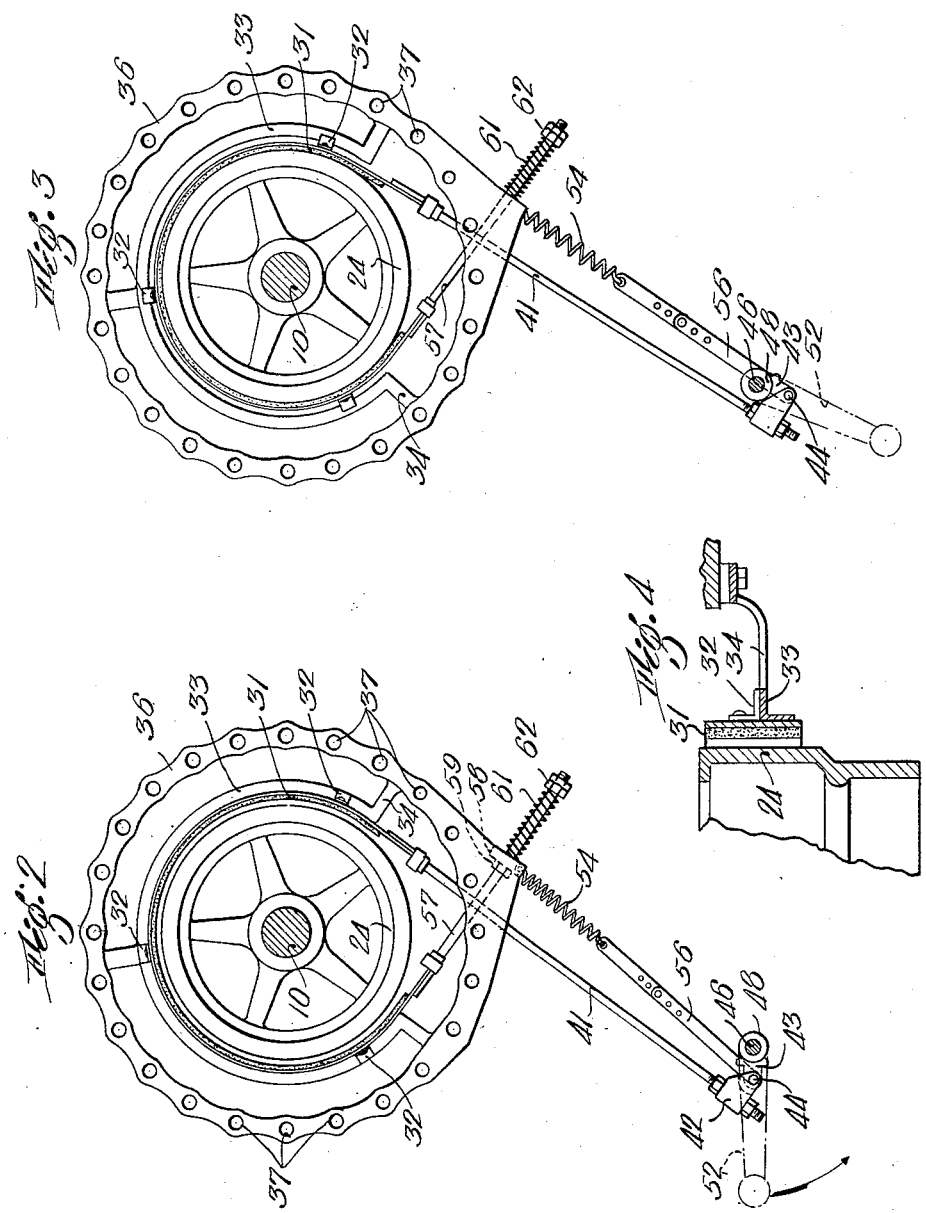

1,863,779

UNITED STATES PATENT OFFICE

FRANK I. WILLIAMS, OF HYDE PARK, MASSACHUSETTS, ASSIGNOR TO AMERICAN TOOL AND MACHINE COMPANY, OF HYDE PARK, MASSACHUSETTS, A CORPORATION OF MASSACHUSETTS

BRAKE

Application filed May 3, 1930. Serial No. 449,466.

This invention relates to apparatus of the kind in which a brake is provided for retarding or stopping a rotary part, as for example a centrifugal machine, more particularly a brake mechanism and a brake assembly for such apparatus.

A centrifugal hydro-extractor is representative of machines of this general class and usually comprises a driven shaft and a shell or curb member disposed concentrically about the shaft, and a brake provided for controlling the driven shaft. One of the principal problems with which a manufacturer of such machines has to deal is that of the arrangement of the brake mechanism. The general exterior contour of such machines being cylindrical, it will be seen that they are adaptable to various positions even in the same plant, subject however to the restriction heretofore imposed, that the apparatus must be so located that the braking mechanism will be readily accessible. While at some additional expense a manufacturer may arrange the brake and the controls therefor in various desired positions, these brakes have usually been so constructed and arranged that an objectionable amount of rebuilding has been necessary to effect an apparently slight modification of the apparatus.

Accordingly, it is a principal object of this invention to provide a brake and control mechanism therefor which may readily be located in any preferred or selected position at the point of assembly or use of such machines. Other objects are to improve the operation and efficiency of brakes for machines of this character; to provide improved means for controlling a brake; and also to provide an apparatus of the class described having an improved construction and arrangement of parts. In the drawings:

Fig. 1 is a side elevation with parts broken away of a centrifugal hydro-extractor;

Fig. 2 is a section taken substantially along the line 2—2 of Fig. 1;

Fig. 3 is a view similar to Fig. 2 but showing the parts in different relative positions; and Fig. 4 is a sectional view of a detail of construction.

The centrifugal hydro-extractor selected for illustrating the features of the present invention comprises a vertically disposed driven shaft 10 having the inner basket member 11 rigidly mounted thereon. The shaft is mounted in bearings 12 and 13 carried by a housing comprising the central hollow post 14 provided with a radially disposed attaching flange 16 to which is secured an outer shell or curb member 17, concentric with the shaft 10. The bottom wall of this curb member is bolted to the flange 16, the bolts 18 which serve to connect the flange 16 and the curb 17 being disposed in a series concentric with the shaft 10 or, in other words, the registering apertures in the parts 16 and 17 in which these bolts are received are disposed substantially along the arc of a circle which is concentric with the shaft 10. The curb member is supported by means of lugs 19 which are suspended from the pedestal members 21, preferably in the manner disclosed in my copending application Serial No. 476,283, filed August 19, 1930. The pedestals 21 are also mounted upon a bed plate 22 which rests upon any suitable foundation structure. The shaft 10 carries a fixed pulley 23, and a brake drum 24 is preferably formed integral with this pulley. Power for operating the apparatus is supplied from a motor 26 through a belt 27 to the pulley 23, or by direct connection to the shaft 10 if the motor is slung beneath.

The brake comprises the brake band 31 (Figs. 2 and 3) encircling the brake drum 24, and has attached to its outer surface a number of supporting abutments, here shown as angle clips 32 which are circumferentially aligned and arranged to ride upon an arcuate member 33 to support the brake band. This arcuate member is arranged concentric with the brake drum and spaced therefrom so that its inner vertical wall may function as a guide and enclosure for the brake. The ends of this arcuate member are separated to form a gap through which operating connections for the brake band may extend. The arcuate member 33 is fixedly supported from the curb by means of a bracket comprising the radially disposed arms 34 which connect the arcuate member 33 and an annular member or flange 36 which is also concentric with the member 33. This annular flange member 36 has a series of substantially uniformly spaced holes 37 located at substantially the same radius from the axis of the shaft 10 or as previously pointed out, along the arc of a circle concentric with this axis. The bolts 18, shown in Fig. 1 extend through selected holes 37 of the series and thus serve to secure the inner and outer annular members 33 and 36 to the bottom wall of the curb as shown in Fig. 1. It will also be noted from this figure that by removing the bolts 18, the brake supporting and guiding assembly including the members 36 and 33 may be turned circumferentially to different positions with respect to the curb member and secured in such positions by inserting the attaching bolts 18 through different sets of holes 37 in the member 36.

An operating connection or rod 41 (Figs. 2 and 3) is secured to one end of the brake band 31 and extends through the gap betweeen the ends of the arcuate supporting member 33 outwardly substantially to the periphery of the curb member. At its outer end, this rod carries a clevis 42 which is pivotally connected to an arm 43 by means of a pin 44. The arm 43 is held fast on a vertically disposed shaft 46 (Fig. 1) by means of a set screw 47. This shaft is supported in upper and lower bearings 47 and 48 respectively, these bearings being carried by brackets 49 and 51, which are arranged to be complementary to the exterior contour of the curb member so that the brackets may be attached at any point about the periphery of the curb member without alteration. An operating handle 52 is mounted upon the upper end of the vertical shaft 46.

It will be apparent that movement of the handle 52 from left to right as shown in Figs. 1 to 3 will be effective to apply the brake 31, and that movement in the opposite direction will release the brake. Means are also provided for holding the brake either on or off and such means preferably comprise the spring 54 (Figs. 2 and 3) which is secured at one end to a fixed abutment, as to the annular member 36, the abutment being disposed radially of the axis of shaft 46 at a point between the extended radii defining the angle of movement of arm 43. The opposite end of spring 54 is connected to an adjustable link 56 which is pivotally connected to the brake operating lever or arm 43 by means of the aforementioned pin 44. It will be seen from Figs. 2 and 3 that the lever 52 and arm 43 are movable through an angle from a position at one side of that plane through the axis of shaft 46 which is tangent to the brake drum, to the other side thereof, that is, from a position to apply the brake to a position to release the same, and that the spring 54 is so connected to the operating arm 43 as to tend to hold this arm in either of the extreme positions of its movement. As shown in Fig. 2, the spring tends to rotate the arm 43 in a clockwise direction, but in Fig. 3 the manual control lever 52 has been moved to a position to apply the brake and this movement has been effective to swing the point of pivotal connection of the link 56 and the arm 43 past the axis of rotation of the arm 43, and consequently the spring 54 now tends to rotate the link 43 in a counter-clockwise direction and hence to apply the brake or to hold it on. When the arm 43 is in the position shown in Fig. 2, the spring 54 acts on this arm to cause the rod 41 to move the brake band outwardly against the guiding surface of the member 33, and this member in turn keeps all portions of the brake uniformly spaced from the drum so that the brake does not drag.

This action is also assisted by the arrangement of the rod 57 which is connected to the other end of the brake and extends through an apertured lug 58 depending from the annular member 36. The rod 57 is provided with a fixed stop 59 which engages the lug 58 to prevent excessive movement of the brake rod 57 through the lug. A relatively weak coil spring 61 is also mounted on this rod 57 on the opposite side of the lug and this spring seats on the lug and also on nuts 62 carried by the outer end of the rod. Whenever the brake is released, the spring 61, acting upon the lug 58, tends to draw the brake about the drum until the fixed stop 59 engages the lug 58. At the same time the spring 54 acts through the rod 41 to force the other end of the brake band outwardly against the guiding member 33 so that it is assured that the brake will be pressed outwardly from the drum and held in this position whenever the manual control lever 52 occupies the position shown in Figs. 1 and 2. On the other hand the spring 61 constitutes a yielding anchorage for one end of the band and insures the application of a braking force of resilient character and thus facilitates the movement of the handle 52 to the brake retaining position of Fig. 3.

I claim:

1. In a machine comprising a normally stationary housing, a driven shaft, a brake drum on the shaft, the machine having free space about the housing to accommodate and receive brake actuating mechanism in different positions of angular adjustment about the housing, the combination of a brake element engageable with the drum, a support for the brake element comprising an arcuate attaching bracket concentric with the shaft, means for securing the bracket to the housing in different positions of angular adjustment while maintaining its concentric relation to the shaft, and a brake operating member extending outwardly from the brake support.

2. In a machine comprising a driven shaft, a brake drum on the shaft and a housing surrounding the shaft, the machine having free space about the housing to accommodate and receive brake actuating mechanism in different positions of angular adjustment about the housing, the combination of a brake engageable with the drum, a guide for the brake having an arcuate surface substantiallly concentric with the drum for guiding and positioning the brake, an attaching bracket carrying the guide, means for securing the bracket to the housing in different positions of angular adjustment while maintaining the concentric relation of the guide and drum and a brake operating member extending between the ends of the brake support.

3. In a machine comprising a housing, a driven shaft within the housing, and a brake drum on the shaft, the combination of a brake engageable with the drum, a guide having an annular surface engageable with the brake and disposed concentrically about the drum and having a gap therein, an attaching bracket comprising an annular member concentric with the annular guide, arms connecting the annular guide and the annular member, means for supporting the annular member in different positions of angular adjustment circumferentially of the housing while keeping the guide concentric with the drum, and a brake operating member extending through the gap in the annular guide.

4. In a machine comprising a housing, a driven shaft within the housing, a brake drum on the shaft, the combination of a brake engageable with the drum, a guide having an annular surface engageable with the brake and concentric with the drum and having a gap therein, an attaching bracket comprising an annular member concentric with the annular guide, arms connecting the annular guide and the annular member, the annular member having a series of holes located substantially on the arc of a circle concentric with the annular guide, and attaching means on the housing engageable in selected ones of said holes for holding the annular member and the annular guide in different circumferential positions concentric with the brake drum.

5. In a machine comprising a housing, a driven shaft within the housing, a brake drum on the shaft, the combination of a brake engageable with the drum, an arcuate support for the brake, abutment means on the brake arranged to ride on the support for supporting the brake, an attaching bracket secured to the support, and means for connecting the bracket to the housing in different selected positions circumferentially of the brake drum while keeping the support concentric with the drum.

6. In a machine comprising a housing, a driven shaft within the housing, a brake drum on the shaft, the combination of a brake band engageable with the drum, concentrically spaced annular members, arms connecting these members, means for supporting the annular members from the housing in different positions circumferentially thereof and concentric with the brake drum, one of the annular members being disposed adjacent to the brake band to form an annular guide for engagement with the latter, said guide member having a gap therein, operating connections for the brake extending through the gap, and means for attaching one of the operating connections to the other of the annular members.

7. In a machine comprising a housing, a driven shaft within the housing, a brake drum on the shaft, the combination of a brake band engageable with the drum, concentrically spaced annular members, arms connecting these members, one of the annular members being disposed adjacent to the brake for slidable engagement therewith, means for slidably supporting the brake band on said one of the annular members, the latter brake supporting member also having a gap therein, operating connections for the brake extending through the gap, means for attaching one of the operating connections to the other of the annular members, and means for supporting the latter member from the housing in different positions circumferentially thereof and concentric with the brake drum.

8. In a machine comprising a housing, a driven shaft within the housing, a brake drum on the shaft, the combination of a brake band engageable with the drum, concentrically spaced annular members, arms connecting these members, means for supporting the annular members from the housing in different positions circumferentially thereof and concentric with the brake drum, one of the annular members being disposed adjacent to the brake band for slidable engagement therewith constituting a guide for the latter, said guide member having a gap therein, operating connections for the brake band extending through the gap, and means for attaching one of the operating connections to the other of said annular members, and means tending to move said latter operating connection in a direction such as to return the brake to its release position.

9. A brake assembly for use with centrifugal machines, said assembly comprising an annular support having a circumferentially extending series of spaced holes, any of which may be selected to receive bolts for securing the support in concentric relation to the axis of the machine and in any desired position of angular adjustment, a brake band carried by the support, and means connecting one end at least of the brake band to the support.

10. A brake assembly for use with centrifugal machines, said assembly comprising an annular support having a circumferentially extending series of spaced holes, any of which may be selected to receive bolts for securing the support in concentric relation to the axis of the machine and in any desired position of angular adjustment, a brake band carried by the support, and a brake band guide concentric with the support and carried thereby, said guide having an opening, and a brake actuating element passing through said opening.

11. A brake assembly for use with centrifugal machines, said assembly comprising an annular support having a circumferentially extending series of spaced holes, any of which may be selected to receive bolts for securing the support in concentric relation to the axis of the machine and in any desired position of angular adjustment, a brake band carried by the support, a brake band guide concentric with the support, means fixedly attaching the guide to the support, the guide being of substantially 270° circumferential extent, and brake actuating elements connected to opposite ends of the brake band and extending outwardly between the ends of the guide.

12. The combination with a brake drum and a brake engageable therewith, of a lever for controlling the brake, said lever being movable from a position to apply the brake to a position to release the brake, and a spring for retaining the lever in either of said positions.

13. The combination with a brake drum and a brake engageable therewith, of a lever for controlling the brake, said lever being movable through an angle from a position to apply the brake to a position to release the same, a fixed abutment disposed at a point between the extended radii defining the angle of movement of said lever, and means reacting between the fixed abutment and the lever tending to urge the lever toward one of said positions.

14. The combination with a brake drum and a brake engageable therewith, of a lever for controlling the brake, said lever being movable through an angle from a position to apply the brake to a position to release the same, a fixed abutment located at a point between the extended radii defining the angle of movement of said lever, and means reacting between the fixed abutment and the lever tending to urge the lever toward one of said positions, said means comprising a spring secured to said abutment and a link pivotally secured to said lever.

15. A centrifugal machine comprising concentrically disposed and relatively rotatable shaft and shell members, a brake drum on the shaft, a brake engageable with the drum, means for supporting the brake from the shell member and in any of a plurality of different positions circumferentially thereof, a lever for controlling the brake, said lever being movable from a position to apply the brake to a position to release the same, and resilient means for holding the lever in either of said positions.

16. In a centrifugal machine comprising a driven member, a brake drum on the driven member, a curb disposed about the driven member, the combination of attaching elements on the curb disposed along the arc of a circle concentric with the brake drum, an arcuate member disposed concentrically about the brake drum and adjacent to the brake for guiding and supporting the latter, and a bracket on the arcuate member, the bracket being supported by some of said attaching elements.

17. In a centrifugal machine comprising a driven member, a brake drum on the driven member, a curb disposed about the driven member, the combination of attaching elements on the curb disposed along the arc of a circle concentric with the brake drum, an arcuate member disposed concentrically about the brake drum and adjacent the brake for guiding and supporting the latter, a lever for controlling the brake, said lever being movable from a position to apply the brake to a position to release the brake, and resilient means tending to hold the lever in either of said positions.

18. A brake mechanism comprising a brake drum and a brake band about the drum, a shaft parallel to the axis of the drum, an arm fixed to the shaft, means connecting the arm to one end of the brake, said arm being movable from a position at one side to a position at the other side of that plane through the shaft axis which is tangent to the brake drum, the brake being set when the arm is in one of said positions and released when it is in the other position, and automatically acting means tending to retain the arm in either of said positions.

19. A brake mechanism comprising a brake drum and a brake band about the drum, a shaft parallel to the axis of the drum, an arm fixed to the shaft, means connecting the arm to one end of the brake, said arm being movable from a position at one side to a position at the other side of that plane through the shaft axis which is tangent to the brake drum, the brake being set when the arm is in one of said positions and released when it is in the other position, respectively, and a spring tending to retain the arm in either of said positions.

20. A brake mechanism comprising a brake drum and a brake band about the drum, a shaft parallel to the axis of the drum, an arm fixed to the shaft, means connecting the arm to one end of the brake, said arm being movable from a position at one side to a position at the other side of that plane through the shaft axis which is tangent to the brake drum, the brake being set when the arm is in one of said positions and released when it is in the other position respectively, a handle on the shaft for turning it, and a spring tending to retain the arm in either of said positions.

21. A brake mechanism comprising a brake drum and a brake band about the drum, a shaft parallel to the axis of the drum, an arm fixed to the shaft, means connecting the arm to one end of the brake, said arm being movable from a position at one side to a position at the other side of that plane through the shaft axis which is tangent to the brake drum, the brake being set when the arm is in one of said positions and released when it is in the other position, respectively, a yielding anchorage for the other end of the brake band, and resilient means tending to retain the arm in either of said positions.

Signed by me at Hyde Park, Mass., this 21st day of April, 1930.

FRANK I. WILLIAMS.